Dec. 22, 1959  P. D. JEWETT  2,917,873
MACHINE FOR CUTTING GERMANIUM SILICON
QUARTZ AND OTHER HARD MATERIALS
Filed July 23, 1958  3 Sheets-Sheet 1

INVENTOR.
PHILIP D. JEWETT
BY
EZEKIEL WOLF, WOLF & GREENFIELD
HIS ATTORNEYS

INVENTOR.
PHILIP D. JEWETT
BY
EZEKIEL WOLF, WOLF & GREENFIELD
HIS ATTORNEYS

United States Patent Office 2,917,873
Patented Dec. 22, 1959

2,917,873

MACHINE FOR CUTTING GERMANIUM SILICON QUARTZ AND OTHER HARD MATERIALS

Philip D. Jewett, Topsfield, Mass., assignor to Transitron Electronic Corporation, Wakefield, Mass., a corporation of Massachusetts Application July 23, 1958, Serial No. 750,485

3 Claims. (Cl. 51—92)

The present invention relates to an arrangement for automatically cutting slices from hard material and in particular, the present invention relates to a machine specifically designed for cutting such hard materials as germanium silicon quartz and the like, automatically.

In cutting very hard material of the type set forth above, it is very desirable to cut the material in stages in which the cutting tool slices through the material in discreet increments. In particular it is desirable to use a cutting tool such as a rotary diamond edge blade in a series of successive traverses in the plane of the cut with each traverse cutting somewhat deeper into the material. This type of procedure in cutting hard material has substantial advantages in minimizing alterations of the desired mechanical and electrical characteristics of the material due to the cutting operation. In addition this particular method of cutting is more accurate than other known means.

In the present arrangement, the desired method of cutting hard materials is accomplished in an automatically controlled system, in which the constructional features of the machine are quite simple and relatively inexpensive in nature. In addition, the present invention provides an arrangement which is quite versatile and adaptable for use in cutting various size slices at various rates of speeds.

Further the present invention provides a construction which is easy to maintain and not likely to be subject to mechanical or electrical failure. In the present invention, there is provided a cutting machine having a table adapted to support the material to be sliced with means for moving the table horizontally in a reciprocal movement. Associated with this horizontal reciprocal movement is means for automatically lowering the cutting tool downwardly toward the table in a succession of intermittent increments. This arrangement thereby provides a means by which the desired cutting technique may be obtained.

In addition to these objects, the present invention provides a drive system for automatic control of the downfeed mechanism which is both efficient and simple in construction. In this arrangement the downward movement of the cutting tool is controlled by a vertically arranged lead-screw. This lead-screw is rotated through a linkage including a magnetic clutch from a power source. Upon energization of the magnetic clutch it engages and causes the lead screw to rotate, thereby lowering the cutting tool. The downward movement of the lead screw is limited by an electrical switch connected in series with the circuitry of the magnetic clutch. The switch is triggered after the lead screw has rotated a selected distance through engagement with a detent carried by the interengaging means between the power source and the lead screw.

These and other objects of the present invention will be more clearly understood when considered in conjunction with the accompanying drawings in which.

Figure 1:
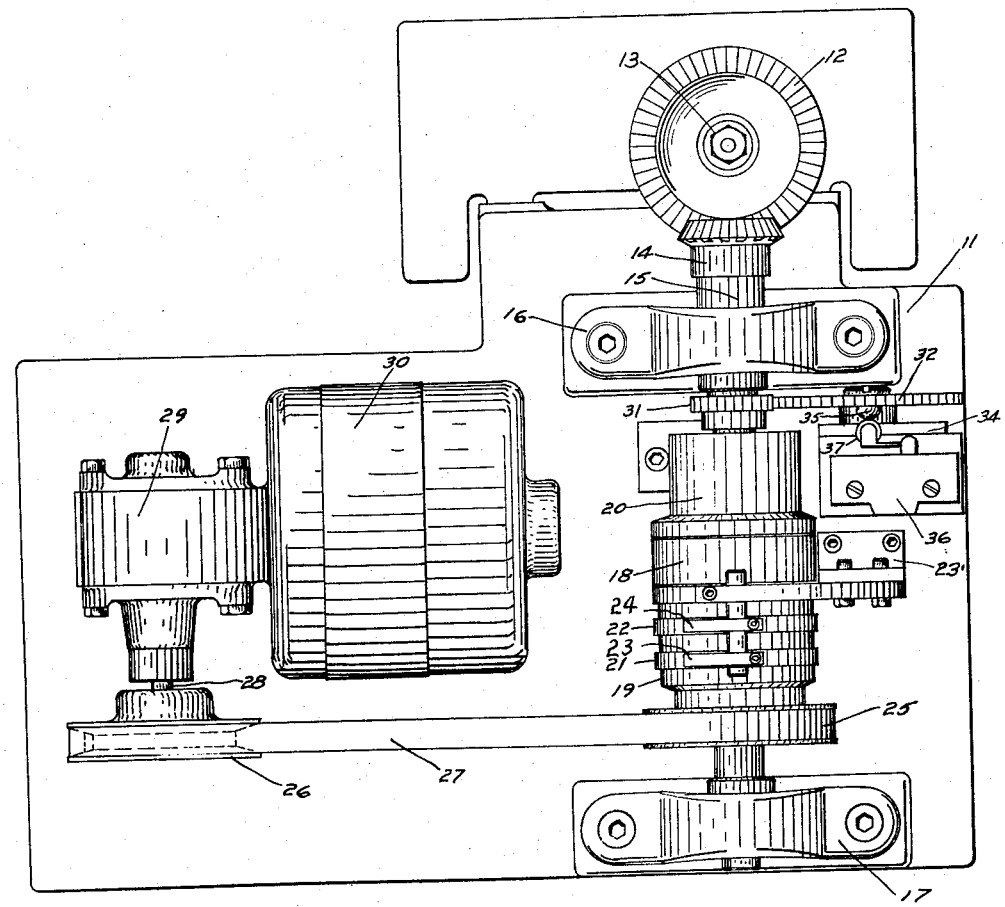
Figure 1 is a top plan view of the down feed operating mechanism.
Figure 2:
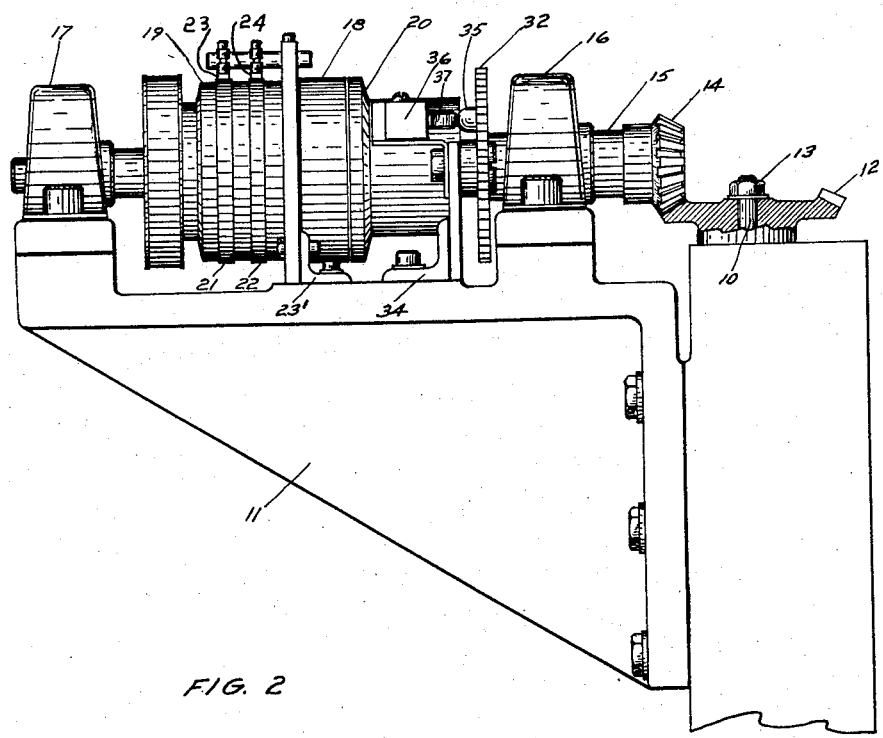
Figure 2 is a side elevation of the down feed mechanism showing in partially fragmentary arrangement the construction of this mechanism.
Figure 3:
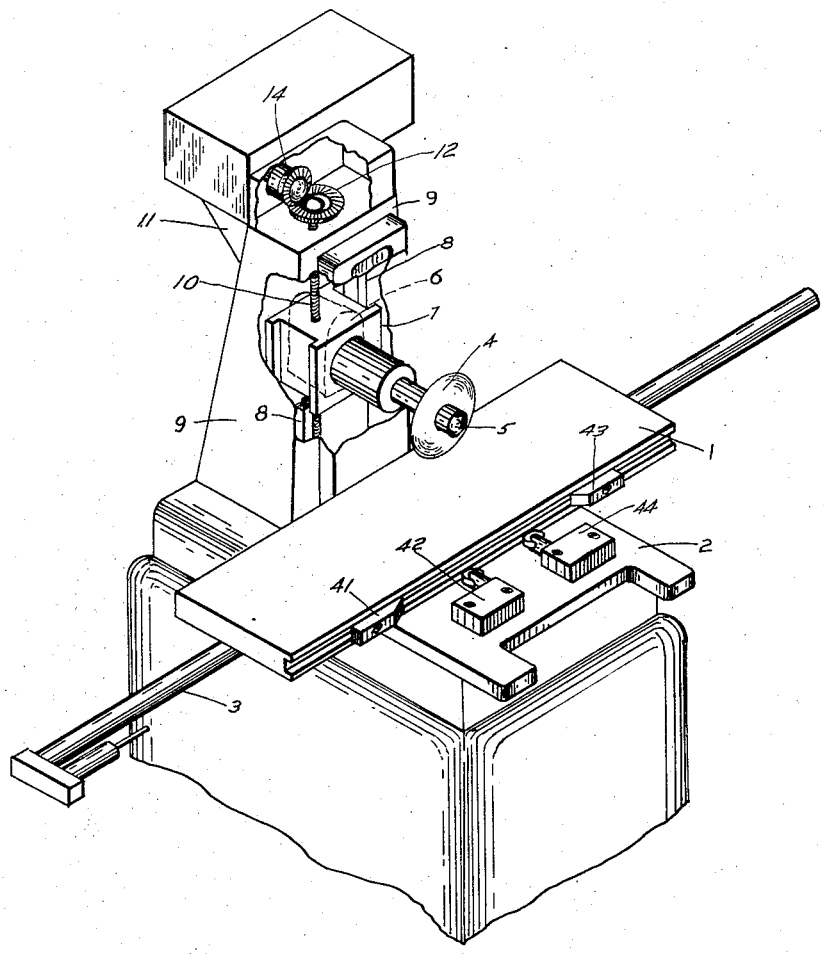
Figure 3 is an isometric view of the cutting machine of the present invention.

Referring to Fig. 3 there is shown in perspective the overall arrangement of the present invention. The material to be cut is secured by suitable means on the table 1. The table 1 in turn is secured to a saddle 2 by conventional means for reciprocal horizontal movement. Such reciprocal horizontal movement may be provided by any conventional means as for example by the air cylinder arrangement 3. The length of travel of the table 1 may be controlled by any desired means.

The cutting blade 4 which may be of any conventional type is supported on the spindle 5 in turn operatively connected to the power source 6. This cutting blade and its means for operation, may all be mounted for vertical movement on a sled 7, so that the cutting blade may be lowered toward the table surface upon each traverse of the material to be cut with respect to the cutting blade.

The sled 7 is mounted for vertical movement on the rails 8, suitably secured and housed in the vertical support member 9. The sled 7 is raised and lowered by means of a lead screw 10 suitably journaled for rotation. The lead screw 10 projects upwardly above a supporting platform 11. At the upper end of the lead screw 10 is provided and suitably secured a bevel gear 12 by means of, for example, a nut 13. This gear 12 interengages the gear 14 in turn mounted on the shaft 15. The shaft 15 is supported for rotary movement by the bearings 16 and 17. These bearings in turn are secured to the platform 11. On the shaft 15 there is mounted a clutch housing 18 containing a magnetic clutch having interengaging halves 19 and 20. The half 20 is suitably fixed to the shaft 15 and is mounted for rotation by means of the clutch anchor arrangement 23'. The half 19 is mounted on the shaft 15 for longitudinal movement with respect to it. This half 19 also provides a pair of slip rings 21 and 22 engaged respectively by brushes 23 and 24, thereby adapted to provide energy to the magnetic clutch for energization of the clutch whereby the halves 19 and 20 may be intermeshed. Mounted on half 19 is a pulley 25. A second pulley 26 is arranged in the same plane as pulley 25 and is interengaged with it by means of the belt 27. Pulley 25 is mounted on shaft 28 in turn operatively connected through the speed reducer 29 to the power source or motor 30. The power source or motor 30 as well as the speed reducer may be suitably mounted on the platform 11.

Also mounted on the shaft 15 is a gear 31. This gear intermeshes with gear 32 which may be of different diameter than gear 31. Gear 32 is mounted for rotation on a supporting bracket 34. Gear 32 also carries a detent 35. A microswitch 36 is also mounted on the bracket 34 and provides a trip lever 37 adapted to be engaged by the detent 35 on each rotation of the gear 32. The lever 37 opens switch 36 which in turn is connected in series with the electromagnet of the magnetic clutch (not shown).

The motor 30 continuously drives the shaft 28 through the speed reducer 29 causing pulley 25 to rotate. Since pulley 25 is keyed to the half 19 of the magnetic clutch, the free half 19 of this clutch will also rotate. The half 19 is interengaged with the half 20 of the magnetic clutch when a signal is fed into the electromagnet of the magnetic clutch through the slip rings 21 and 22. The signal is derived from the movement of the table. When the table reaches the limit of its movement during a cutting traverse a detent 41 on the table engages the microswitch 42 on the table. This microswitch closes a circuit to the magnetic clutch, thereby causing the magnetic clutch halves to engage. When these halves engage the power provided from the motor 30 will cause the shaft 15 to rotate. This rotation will cause the lead screw to rotate. When the lead screw rotates, the sled 7 moves downwardly. This downward movement of the sled is interrupted at a discreet distance of movement when the magnetic clutch is disengaged. This engagement of the magnetic clutch is caused through the tripping of the microswitch 36 through the gears 31 and 32. It will be noted that the amount of rotation of lead screw may readily be controlled by interchanging gears 31 and 32 with gears of different sizes. It will also be noted that the magnetic clutch serves in addition to engaging the power source with the shaft 15 to provide a braking means once the power source is disengaged, so that there will not be any coasting of the shaft 15. It will therefore be seen that upon each traverse of the table underneath the cutting tool or blade 4, the cutting blade will be moved downwardly a discreet distance. It will also be noted that the table is allowed to return to its initial starting position before the downward movement commences. Microswitch 44 when engaged by the detent 43 causes the table to reverse its movement. It will be noted that this occurs before microswitch 42 is actuated.

Having now described my invention, I claim:

1. In an arrangement for automatically lowering a cutting tool in incremental stages toward a horizontally reciprocally moveable table for cutting a slice from material positioned on said table, supporting means supporting said tool for vertical movement, a lead screw operatively engaging said supporting means for raising and lowering the same, a shaft, gear means operatively interconnecting said shaft and lead screw, a magnetic clutch having halves interengageable upon electrical energization with one half fixed to said shaft, a power source adapted to be operatively coupled to said shaft through the other half of said clutch, a pair of interengaging gears with one coaxially fixed to said shaft and the other having a detent secured thereto in a position spaced from its axis, a switch adapted to deenergize said clutch positioned to be tripped by said detent on rotation of said interengaging gears whereby said lead screw may be rotated and said cutting tool thereby moved vertically in incremental stages.

2. A down feed mechanism for use in a cutting machine comprising a lead screw adapted to operatively engage vertically moveable cutting means for lowering the same, a shaft journaled normal to said lead screw, gear means operatively interengaging said screw and shaft, a clutch mounted on said shaft having interengageable halves with one half keyed to said shaft and the other half freely rotatable on said shaft with power means operatively engaging for rotation said other half, means for intermeshing said halves and thereby operatively connecting said power means and lead screw, a pair of intermeshing gears with one keyed to said shaft and the other having detent means associated therewith, switch means adapted to be actuated by said detent operatively connected to said means for intermeshing whereby on actuation of said switch, said clutch halves will be disengaged and said lead screw will cease to rotate.

3. In an arrangement for automatically lowering a cutting tool in incremental stages toward a horizontally reciprocally moveable table for cutting a slice from material positioned on said table, supporting means supporting said tool for vertical movement, a lead screw operatively engaging said supporting means for raising and lowering the same, journal means supporting said lead screw in a vertical position, a shaft positioned normal to said lead screw, journal means supporting said shaft, gear means operatively interengaging said shaft and lead screw, a magnetic clutch having halves interengageable upon electrical energization with one half fixed to said shaft and the other half freely rotatable with respect to said shaft, a slip ring and brush assembly associated with said other half for providing electric power thereto, a power source having a drive shaft with a pulley mounted thereon, a second pulley coaxially mounted on said first mentioned shaft and fixed to said other half of the clutch, a V-belt interconnecting said pulleys, a pair of interengaging gears with one coaxially fixed to said shaft and the other mounted for rotation in parallel alignment therewith, said other gear having a detent secured thereto in a position spaced from its axis, a switch adapted to be tripped by said detent on rotation of said other gear, said switch operatively connected to said magnetic clutch for deenergization of the same whereby said lead screw may be rotated a preselected number of degrees intermittently.

References Cited in the file of this patent

UNITED STATES PATENTS

| | | |
|---|---|---|
| 1,108,779 | Norton | Aug. 25, 1914 |
| 1,488,737 | Conradson | Apr. 1, 1924 |
| 1,570,318 | Pollard | Jan. 19, 1926 |
| 1,927,007 | Whittles | Sept. 12, 1933 |
| 2,080,976 | Wood | May 18, 1937 |
| 2,378,066 | De Young | June 12, 1945 |
| 2,477,733 | Garside | Aug. 2, 1949 |